US006896221B1

(12) United States Patent
Einarsson

(10) Patent No.: US 6,896,221 B1
(45) Date of Patent: May 24, 2005

(54) VERTICAL TAKEOFF AND LANDING AIRCRAFT

(75) Inventor: Einar Einarsson, Studlasel 31, 109 Reykjavik (IS)

(73) Assignees: Einar Einarsson, Reykjavik (IS); Lloyd L. Zickert, Hinsdale, IL (US)

( * ) Notice: Subject to any disclaimer, the term of this patent is extended or adjusted under 35 U.S.C. 154(b) by 0 days.

(21) Appl. No.: 10/414,874

(22) Filed: Apr. 16, 2003

(51) Int. Cl.$^7$ .................................................. B64C 3/38
(52) U.S. Cl. ................................... 244/7 C; 244/12.4
(58) Field of Search .............................. 244/7 R, 7 A, 244/7 C, 12.4, 56, 66

(56) References Cited

U.S. PATENT DOCUMENTS

| | | | |
|---|---|---|---|
| 1,491,954 A | 4/1924 | Jacobs | |
| 2,077,471 A | 4/1937 | Fink | |
| 2,396,189 A * | 3/1946 | Millar ........................ | 244/105 |
| 2,780,424 A | 2/1957 | Price | |
| 2,912,188 A | 11/1959 | Singelmann et al. | |
| 2,930,544 A | 3/1960 | Howell | |
| 3,002,709 A | 10/1961 | Cochran | |
| 3,049,320 A * | 8/1962 | Fletcher ..................... | 244/12.4 |
| 3,059,876 A * | 10/1962 | Platt .......................... | 244/7 C |
| 3,061,242 A | 10/1962 | Zurawinski et al. | |
| 3,106,369 A | 10/1963 | Borst | |
| 3,126,170 A | 3/1964 | Dornier | |
| 3,127,129 A | 3/1964 | Petrie | |
| 3,155,342 A | 11/1964 | Bolkow et al. | |
| 3,181,810 A * | 5/1965 | Olson ......................... | 244/7 R |
| 3,223,354 A | 12/1965 | Seibold et al. | |
| 3,278,138 A | 10/1966 | Haberkorn | |
| 3,379,395 A | 4/1968 | Smith | |
| 3,393,882 A | 7/1968 | Soulez-Lariviere et al. | |
| 3,404,852 A * | 10/1968 | Sambell et al. ............ | 244/7 A |
| 3,577,736 A | 5/1971 | Stevens | |
| 3,592,412 A * | 7/1971 | Glatfelter ................... | 244/7 A |
| 3,666,209 A * | 5/1972 | Taylor ........................ | 244/7 C |
| 3,797,783 A * | 3/1974 | Kisovec ..................... | 244/7 A |
| 3,823,897 A | 7/1974 | Bloomquist | |
| 4,358,074 A | 11/1982 | Schoen et al. | |
| 4,804,155 A | 2/1989 | Strumbos | |
| 5,085,315 A * | 2/1992 | Sambell ...................... | 244/7 R |
| 5,096,140 A * | 3/1992 | Dornier et al. ............. | 244/7 C |
| 5,115,996 A | 5/1992 | Moller | |
| 5,141,176 A * | 8/1992 | Kress et al. ................ | 244/7 C |
| 5,209,428 A | 5/1993 | Bevilaqua et al. | |
| 5,372,337 A | 12/1994 | Kress et al. | |
| 6,367,736 B1 * | 4/2002 | Pancotti ...................... | 244/7 R |
| 6,607,161 B1 * | 8/2003 | Krysinski et al. .......... | 244/7 A |

* cited by examiner

Primary Examiner—Tien Dinh
(74) Attorney, Agent, or Firm—Lloyd L. Zickert

(57) ABSTRACT

A vertical takeoff and landing aircraft, which includes pivotal wing and engine assemblies on a fuselage with tail assemblies extending from each of the wing assemblies and the engines being operable in turbo prop or pure jet mode, wherein the aircraft is configured such that it can be landed or taken off vertically or in a horizontal mode along a runway.

12 Claims, 5 Drawing Sheets

VERTICAL TAKEOFF AND LANDING AIRCRAFT

This invention relates in general to a vertical takeoff and landing aircraft, and more particularly to an aircraft having pivotally mounted wing assemblies that include engines and tail assemblies, and more particularly to a vertical takeoff and landing aircraft capable of taking off and landing from a relatively small area or along a runway where respectively the aircraft is operable in vertical takeoff and landing mode or horizontal flying ode.

BACKGROUND OF THE INVENTION

Heretofore, it has been well known to provide vertical takeoff and landing aircraft. Many different proposals have been advanced for producing vertical thrust for an airplane. For example, the very old Jacobs U.S. Pat. No. 1,491,954 patent merely discloses an aircraft having a blower that creates an airflow across the wing members in order to provide lifts as well as a forward propulsion force.

Several prior art aircraft capable of producing vertical lift which include mounting engines that will rotate on the body of an aircraft to provide either downward thrust or forward thrust are disclosed in U.S. Pat. Nos. 2,780,424; 2,912,188; 3,061,242; 3,155,342; and 3,278,138.

Other aircraft proposed to have vertical takeoff and landing abilities include aircraft where the sole use of flaps or cowlings movable from one position to provide horizontal thrust and another to provide vertical thrust are illustrated in U.S. Pat. Nos. 3,126,170; 3,577,736; 3,823,897; 4,358,074; 4,804,155; 5,115,996; 5,209,428; and 5,372,337.

It has also been known to provide a rotatable engine with extremely large blades that are rotated for providing lift or forward thrust, as disclosed in U.S. Pat. Nos. 3,106,369 and 3,393,882.

It has also been known to provide a combination of engines for driving first propellers that will cause only vertical thrust and also exhaust streams for only providing horizontal thrust where the engines that provide the horizontal thrust also have mechanical linkage connected to the propellers that provide vertical thrust, as disclosed in U.S. Pat. No. 3,002,709.

The most publicized recent vertical and takeoff landing aircraft is the United States V-22 Osprey, which includes a fuselage having wings extending from opposite sides and a tail assembly at the rear end of the fuselage. Propulsion power is provided by two engines, one mounted on each end of the wings, having a helicopter size rotor. The engines are pivotally mounted on the ends of the wings and must be vertically oriented so that the helicopter type blades extend substantially horizontal like the main rotor of a helicopter. Once the aircraft is airborne, the engines are swung into horizontal position to orient the rotors in vertical position and provide horizontal thrust to the aircraft.

A diagrammatic showing of the V-22 aircraft is shown in FIGS. 1 and 2. The V-22 aircraft is generally designated by the numeral 15 and includes an elongated fuselage 16 having a cabin or operator's cockpit 17 at the front end of the aircraft and a tail assembly 18 at the rear end of the aircraft. Fixed wings 19 extend from both sides of the fuselage 16 and engines 20 are pivotally mounted on the ends of the wings. The engines drive rotors 21 that provide lifting thrust when the engines are in vertical position, as shown in FIG. 1 in solid lines, and horizontal thrust when the engines are horizontally disposed, as shown in phantom in FIG. 1. Several control surfaces are provided on the wings and the tail assembly in order to maneuver the aircraft through pitch, yaw and roll movements. However, it is well known that the V-22 aircraft has been plagued with a plethora of safety problems and currently has found disfavor in the military. Further, because the rotors are so large, it is impossible to land the aircraft with the engines in horizontal position, as the rotors would engage the ground as particularly illustrated in FIG. 1 where the engines are in horizontal position and the rotors penetrate through the ground level. Thus, if the engine pivoting mechanism on the aircraft malfunctions and fails to allow rotation of the engines into vertical position, any attempt to land the aircraft otherwise would cause the rotors to strike the ground and become useless, resulting in crashing or at least damaging the aircraft.

It is also well known that the British Harrier aircraft is capable of takeoff and landing maneuvers as well as forward flight maneuvers. However, the Harrier aircraft requires the use of jet engine diverters for producing the vertical takeoff and landing thrusts, and overall safe operation of the aircraft has not always been acceptable. Further, the hot gases from the Harrier engines exhausting in such close proximity to the landing or takeoff surface have a damaging effect to the landing or takeoff surfaces. Moreover, the engine and diverter assemblies are very expensive to make and to maintain.

In today's world, practically the only aircraft acceptable for vertical takeoffs and landings and horizontal flight is the well known helicopter. However, the helicopter cannot attain very high forward speeds because it relies on the overhead rotor in order to provide forward thrust of the aircraft.

SUMMARY OF THE INVENTION

The present invention overcomes the problems heretofore encountered in providing a vertical takeoff and landing aircraft that can attain high speeds in horizontal flight. It also overcomes the problems of being able to safely attain vertical flight in takeoff and landing maneuvers. The aircraft of the present invention is configured to also permit conventional landing on a runway, as well as having vertical takeoff and landing capabilities from a small area not much larger than the footprint of the aircraft.

The vertical takeoff and landing aircraft of the present invention includes a fuselage for the operating crew and/or passengers and/or freight. A tail assembly is mounted on the fuselage and extends rearwardly for stability and maneuvering, and pivotal wing and engine assemblies extend from each side of the fuselage. The wing portion of the wing and engine assemblies includes control surfaces for maneuvering the aircraft and the engines are fixedly mounted on the wing portions. While any number of engines may be used, one engine on each of the wing portions is shown for this application. Each engine is preferably a jet fuel driven turbine engine also having a transmission for selectively driving a propeller. The blades of the propeller are movable between operating position and folded back non-operating position, where the engine may serve as a turbo prop engine or as a pure jet engine. Thus, the transmission will allow the propellers to be disengaged and stopped during horizontal flight mode. Flaps are also provided on wing portions of the wing and engine assemblies for use in not only providing braking power where necessary but also to assist in providing vertical thrust during vertical takeoff and landing procedures.

Optionally, additional tail assemblies may extend rearwardly from the wing and engine assemblies to provide further stability. These assemblies may also have control surfaces to assist in maneuvering the aircraft. The wing and engine assemblies are mounted high on the aircraft fuselage and the diameter of the propellers is such that where malfunction of the mechanism for pivoting the wing and engine assemblies is encountered, the aircraft can be landed in a horizontal mode on a runway without having the blades of the propellers engaging the runway surface.

It will be appreciated that the aircraft of the invention may be provided with floats for enabling it to be landed and taken off from water, as well as wheel gear for permitting the landing or taking off from land. Preferably, the wheel gear is retractable.

It should also be appreciated that the size of the fuselage may be such as to accommodate only a few passengers or as many passengers as needed for commercial travel. In this regard, it is also possible that the aircraft of the invention can be sized for use as a private aircraft for an individual.

It is therefore an object of the present invention to provide a new and improved vertical takeoff and landing aircraft capable of taking off vertically or along a runway and also landing vertically or along the runway without damaging any part of the aircraft.

A further object of the present invention is to provide a new and improved vertical takeoff and landing aircraft capable of having wing and engine assemblies pivotally mounted on the fuselage with jet fuel driven turbine engines capable of providing jet thrust and driving propellers primarily for use in the vertical flight mode.

A still further object of the present invention is in the provision of an improved vertical takeoff and landing aircraft having improved stability to produce safer vertical takeoff and landing maneuvers.

A still further object of the present invention is to provide a vertical takeoff and landing aircraft that can attain high speeds in horizontal flight.

Other objects, features and advantages of the invention will be apparent from the following detailed disclosure, taken in conjunction with the accompanying sheets of drawings, wherein like reference numerals refer to like parts.

DESCRIPTION OF THE INVENTION

Figure 1:
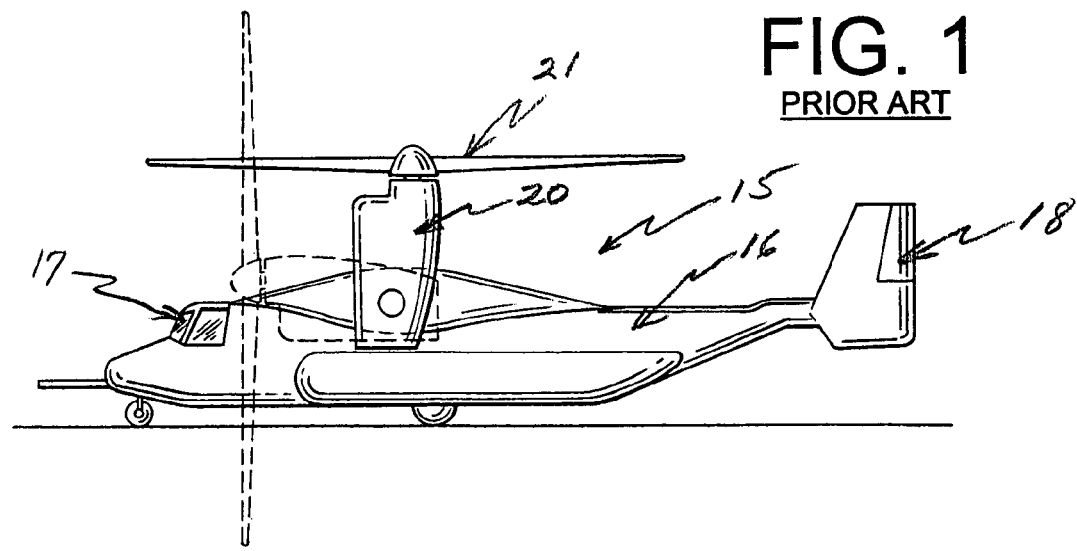
FIG. 1 is a diagrammatic elevational view of a prior art V-22 Osprey showing the engine nacelle in solid lines position for vertical takeoff and landing mode and showing in phantom the engine nacelle in horizontal position showing that it is impossible to land the aircraft on a horizontal runway without damaging the propellers.
Figure 2:
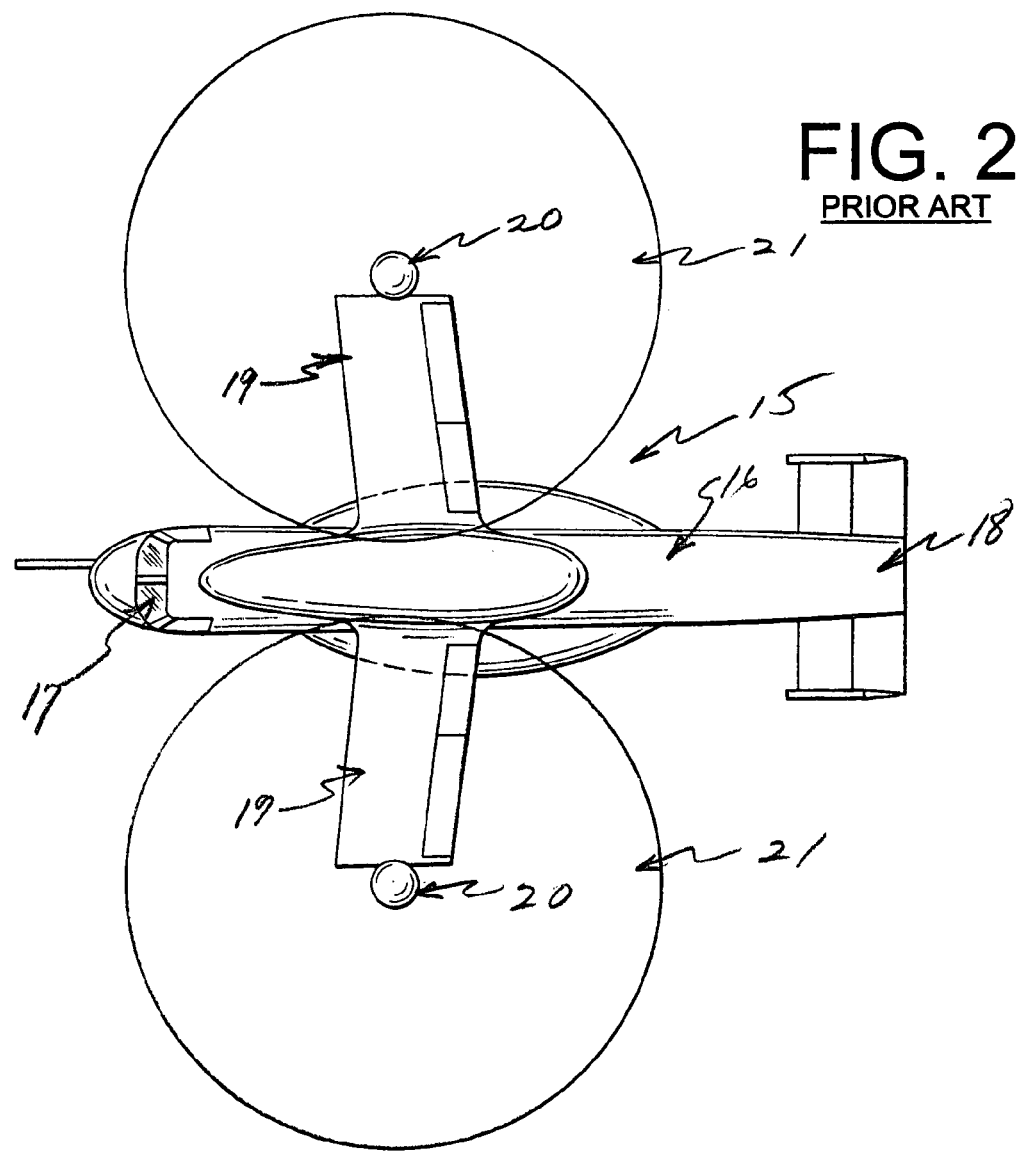
FIG. 2 is a top plan view of the prior art V-22 Osprey shown in FIG. 1.

Referring now to the drawings, and particularly to FIGS. 1 and 2, which show the prior art V-22 Osprey aircraft to illustrate the inability of the aircraft to land in a horizontal mode on a runway. The present invention overcomes this problem inasmuch as the propeller blades do not have to be as large as the helicopter-type propeller blades of the V-22 Osprey.

It will be understood that the term "horizontal flight mode" used herein refers to when the aircraft of the invention is flying directly horizontally or substantially horizontally when it would be climbing, descending, or taking off or landing along a runway. The phrase "vertical flight mode" used herein refers to when the aircraft would be taking off or landing vertically or substantially vertically. The term "control surfaces" uses herein refers to any movable flap or panel on or along a wing or tail assembly capable of producing roll, yaw or pitch maneuvers causing the aircraft to ascend or descend or change its direction of travel. These maneuvers are associated with the roll, yaw and pitch axes of the aircraft, so as to allow the aircraft to be directionally variable between horizontal and vertical attitudes for driving the airplane either vertically while the fuselage remains in horizontal attitude or substantially horizontal as in normal flight.

Referring now to the embodiment of FIGS. 3 to 6, a preferred embodiment of the invention is shown and generally designated by the numeral 25. The aircraft includes an elongated fuselage generally indicated by the numeral 27, a pair of opposed wing and engine assemblies generally indicated by the numerals 30 and 31.

The elongated fuselage 27 includes a cockpit area 33 for a pilot and/or a co-pilot, front and back doors 35 and 37 for allowing entry and departure from the aircraft by the pilots, other crew members, and any passengers. Appropriate seating may be provided within the passenger area for passengers. While only two doors are shown, any number of doors may be provided and they may be provided on both sides of the fuselage if so desired. Also shown is a baggage compartment door 39 adjacent to the rear end of the fuselage for a baggage compartment. A tail assembly 41 includes a vertical stabilizer 43 and a horizontal stabilizer 44. It will be understood that suitable pitch control surfaces will be provided on the horizontal stabilizer 44, while suitable yaw control surfaces will be provided on the vertical stabilizer 43.

Figure 3:
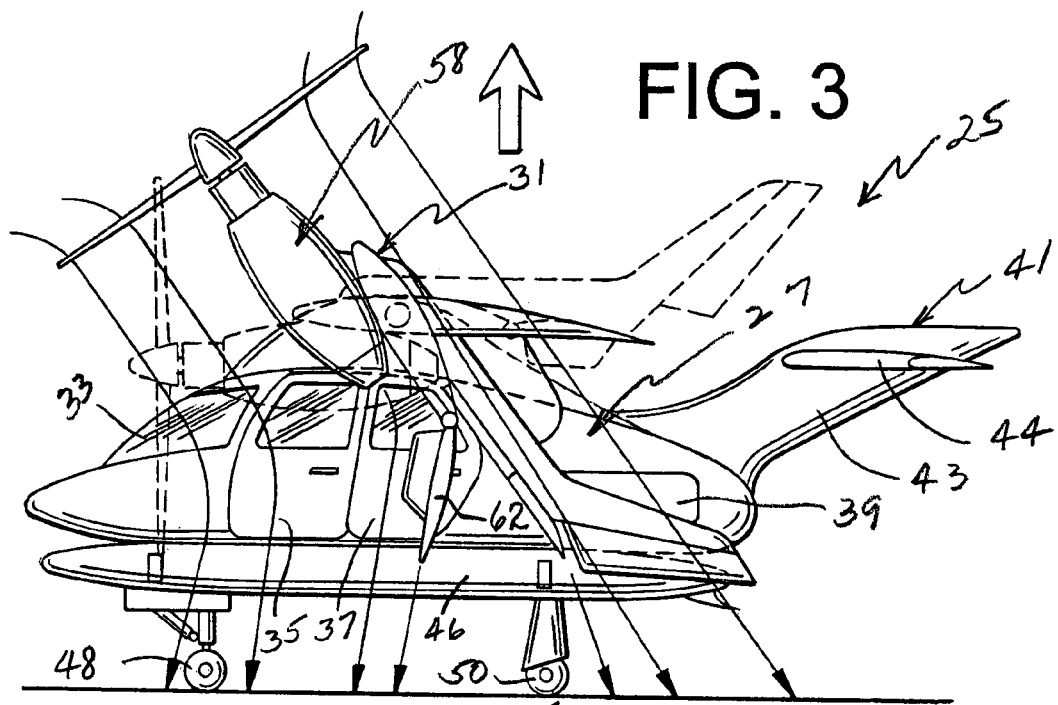
FIG. 3 is an elevational view of the improved vertical takeoff and landing aircraft according to the present invention showing the wing and engine assemblies in solid lines and tilted for vertical takeoff and landing maneuvers and also illustrating the wing and engine assemblies in horizontal position in phantom.

At the underside of the fuselage, any suitable landing gear may be used. In the illustrated embodiment of FIGS. 3 to 6, a pair of floats 46 is provided which enable the aircraft to land on and take off from water. Additionally, the floats include retractable landing gear with wheels 48 and 50, as seen in FIG. 3, which enables the aircraft to land and take off on land, and rudders at the trailing ends to assist in directional control on the water. The wheels also permit the landing or taking off while the aircraft is in a vertical flight mode or if the aircraft is in a horizontal flight mode. Thus, any suitable landing gear may be provided for the aircraft.

It will be appreciated that when landing on water the wheels would be in retracted position, and when landing on land the wheels would be in extended or down position.

Accordingly, it should be appreciated that the aircraft can have any type of landing gear that would be desirable for use by the owner, and it could land on either water or land where it would have the combination pontoon gear and wheel gear. Further, the wheel gear would be designed so that the aircraft could land vertically or horizontally along a runway. Additionally, it would be appreciated that controls would be provided in the cockpit for operating the retractable wheel landing gear.

The wing and engine assemblies 30 and 31 would be identical but of opposite hand wherein the assembly 30 is disposed on the right side of the aircraft and the assembly 31 is disposed on the left side of the aircraft. Each assembly would include a rearwardly extending tail assembly to provide additional stabilization and maneuverability during vertical takeoff and landing mode as well as during horizontal flight mode. A centrally positioned and vertically extending support member 52 includes a transversely extending shaft 53 extending from opposite sides of the support member and on which each of the wing and tail assemblies is suitably attached whereby rotation of the shaft 53 by a suitable drive mechanism will produce pivotal rotation of the wing and tail assemblies between the position shown in solid lines in FIG. 3 for producing vertical flight for substantially vertical takeoff and landing maneuvers and the horizontal position shown in phantom in FIG. 3 in solid in FIGS. 4, 5 and 6 for producing substantially horizontal flight of the aircraft. The arrowed lines in FIG. 3 depict the air flow during vertical takeoff and landing mode, while the large arrow indicates direction of flight. The groups of lines in FIGS. 4 and 5 indicate exhaust gases and thrust produced by the engines, while the large arrow in FIG. 5 indicates the aircraft is in horizontal flight mode. The dash lines in FIG. 6 indicate the path of the outer ends of the propeller blades. Suitable controls in the cockpit would operate drive means for driving the shaft 53 to rotate the wing and engine assemblies between the vertical takeoff and landing position and the horizontal flight mode position.

Each of the wing and engine assemblies includes a wing 56, a jet fuel driven turbine engine 58, and a tail assembly 60. While the wing 56 may take any suitable shape, it is slightly swept back and longer between the leading and trailing edges in the area where the engine 58 is mounted. At the trailing edges of the wings, a flap 62 is positionable as shown in FIG. 3 to direct the air stream created by the engine downwardly during vertical takeoff and landing maneuvers. Additionally, the flaps 62 may be used and positioned for braking purposes where the aircraft is landed on a runway or slowed to shift between horizontal to vertical flight mode. Flaps 64 are provided in the leading edges of the wings for additionally controlling airflow as needed in order to enhance lift and/or other maneuvers of the aircraft. Suitable aileron control surfaces are provided on the wings to produce roll maneuvers.

The engines 58 are operable to function as a jet engine or as a turbo prop engine, it being understood that the engines will function as a turbo prop engine during vertical takeoff and landing operation and in the jet mode during horizontal flight in order to obtain the highest speeds of travel for the aircraft. In order for the engine to operate as a turbo prop engine, it includes a propeller 66 having a plurality of blades 67 and mounted on an output propeller shaft 69 that extends from a suitable transmission 71 that is connected to the fan of the engine 58. The blades 67 are foldable between an operating position as shown in solid lines in FIG. 3 and in dotted lines in FIGS. 4 and 5 and in non-operating position as shown in solid lines in FIGS. 4 and 5 where the blades are folded up against the engine. Suitable controls are provided in the cockpit for driving the blades between the operating position and the non-operating position. It will be appreciated that the blades will be in the non-operating position during vertical takeoff and landing maneuvers and in the folded back non-operating position during horizontal flight in order to reduce the drag on the aircraft. The blades may also used in operating position for landing or takeoff on a runway.

With respect to the wing and tail assemblies, the wings will include suitable control surfaces in order to control and maneuver the aircraft and which would include vertical fins or vanes 74 that are pivotally mounted on the pivots 75 for assisting in the directional maneuvering of the aircraft in both vertical and horizontal flight modes, as well as providing stability to the aircraft. Suitable ailerons will be provided on the wings and, for example, can be provided on the flaps in order to provide and produce roll movements of the aircraft. It should be appreciated that the tail assembly 60 includes a horizontal stabilizer 76 and an inclined upwardly extending stabilizer 78. As seen particularly in FIG. 6, the upwardly extending stabilizers 78 are not vertically oriented but oriented at an incline or a slant, the ones on opposite tail assemblies going in opposite directions. The tail assemblies will also include suitable control surfaces for producing pitch and yaw maneuvers of the aircraft. Thus, the aircraft will be provided with suitable control surfaces for controlling pitch, yaw and roll as needed.

Accordingly, it will be understood that when the aircraft is in horizontal flight mode it will fly directly horizontally or substantially horizontally when climbing, descending, cruising, taking off or landing along a runway. Similarly, when the aircraft is in vertical flight mode, it will be producing the downward air stream thrust that will enable the aircraft to take off or land vertically or substantially vertically. With respect to the propellers, it will be understood that they can be multi-bladed propellers with or without pitch adjustability.

Referring now to FIG. 3, it will be appreciated that the wing and engine assemblies are pivoted to the position shown in solid lines to provide the vertical thrust for vertical takeoff and landing mode. Additionally, the flaps 62 are actuated and driven to the position shown where they are substantially vertically positioned after the wing is tilted. The air stream, produced by the propellers will be driven across the wing to produce lift and against the flaps to produce a vertical thrust for vertical takeoff and landing flight mode and the suitable lift for the aircraft so that it can fly vertically. Once the aircraft has reached a selected altitude, the wing and engine assemblies can then be pivoted to their substantially horizontal positions for attaining substantially horizontal flight.

The blades preferably will be folded back against the engine nacelle during horizontal flight to allow pure jet operation in order to produce the highest possible travel speed for the aircraft. At this time the transmission for driving the propeller will be deactivated or disengaged so that the propellers will not rotate, thereby allowing the thrust of the aircraft to be attained solely by the use of the jet engines. However, it should be appreciated that the propellers could be used for horizontal flight if so desired.

Unlike the prior art V-22 craft shown in FIGS. 1 and 2, because the engine is on the wing and ahead of the wing and rotates with the wing so that the engine thrust is always along the wing, the transition from vertical to horizontal flight is quicker and more efficient. At least part of the wings on the V-22 always work against the thrust of the propeller as it merely sends the thrust downwardly onto the top of the wings during vertical flight until the engine is completely pivoted to the horizontal position so that the thrust of the propeller can then be driven across the wings for creating lift.

Moreover, the aircraft of the invention is lighter in weight than the V-22 aircraft of FIGS. 1 and 2 because the aircraft of the invention does not use heavy helicopter-type rotors and likewise heavy drive gear to drive the rotors as is necessary in the V-22. Moreover, the wing of the aircraft of the present invention can be made smaller, thereby providing less resistance to the airflow and allowing for greater speed. The wing structure of the V-22 has to be built with extraordinary heavy weight mechanisms and supports to prevent the wing from breaking under the stress of the helicopter-type blades of the engines as their force is at the tip ends of the wings.

The elevators and rudder of the V-22 cannot be used when taking off and landing vertically unlike the tail assemblies on the wing and engine assemblies of the aircraft of the present invention where they can be used to assist in maneuvering the aircraft during vertical takeoff and landing operations.

It may also be readily recognized that the aircraft of the present invention can land and take off horizontally on a runway unlike the V-22 because the propellers of the aircraft of the present invention will not strike or engage the ground when the engines are in horizontal position and generally parallel to the fuselage. The helicopter blades of the V-22 would strike the ground in the event an attempt was made to land horizontally on a runway.

Figure 4:
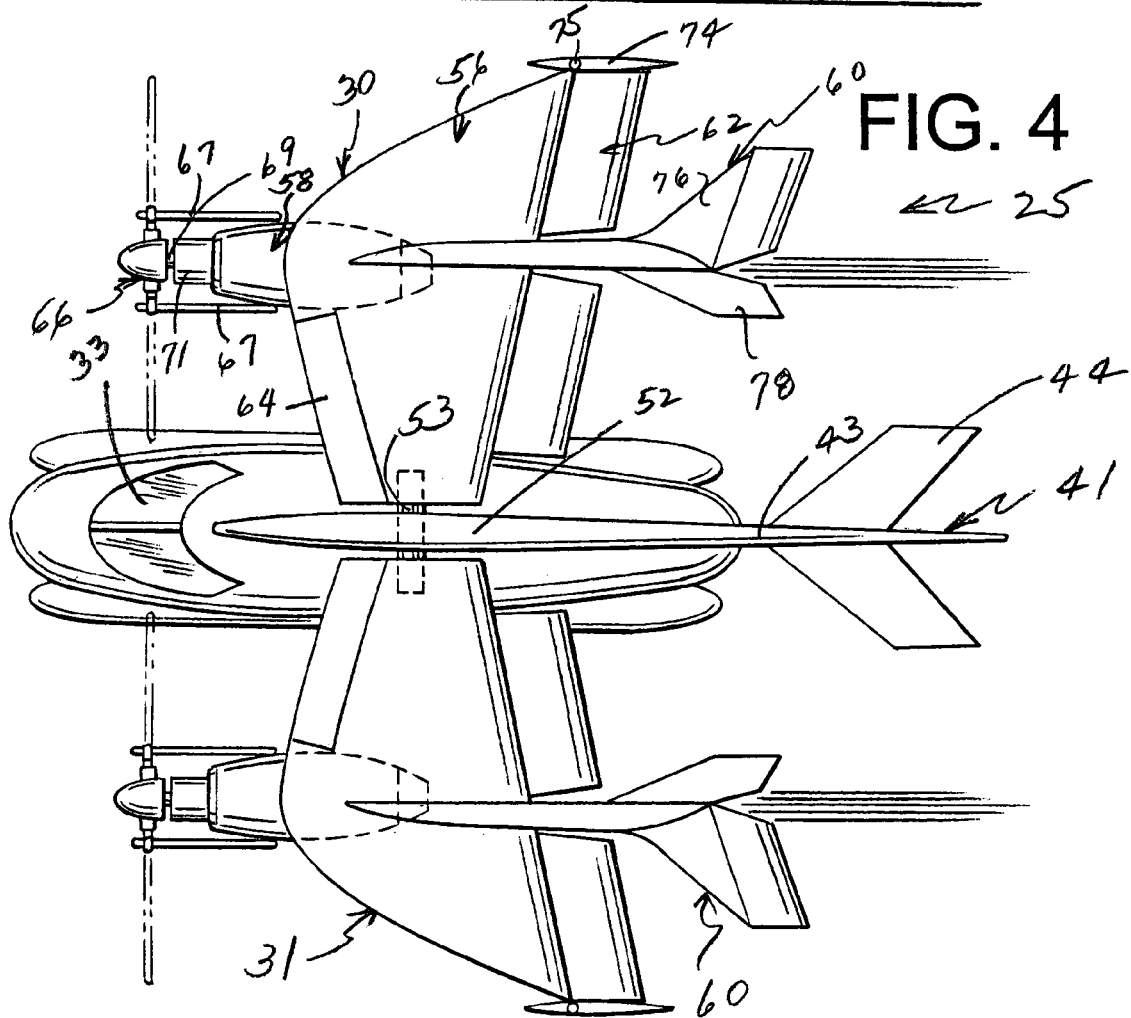
FIG. 4 is a plan view of the aircraft of FIG. 3 and showing the aircraft in horizontal flying mode with the propellers of the engines folded back in non-operating position in solid lines and extending in dotted lines for operating position.
Figure 5:
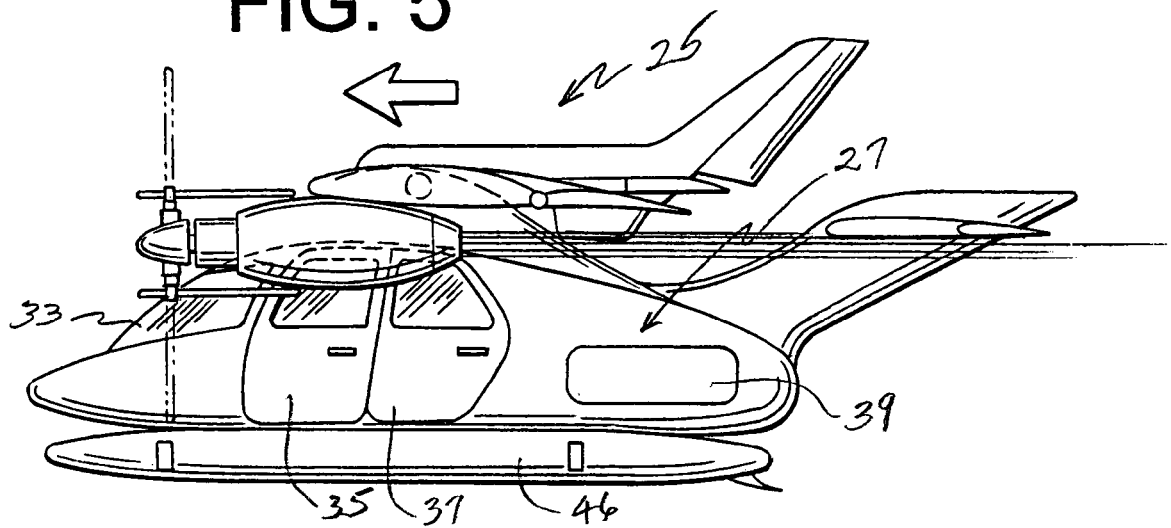
FIG. 5 is a side elevational view of the aircraft of FIGS. 3 and 4 illustrating the aircraft in horizontal flying mode with the propellers folded back into non-operating position and also showing in phantom how the propellers would be positioned in operating mode.
Figure 6:
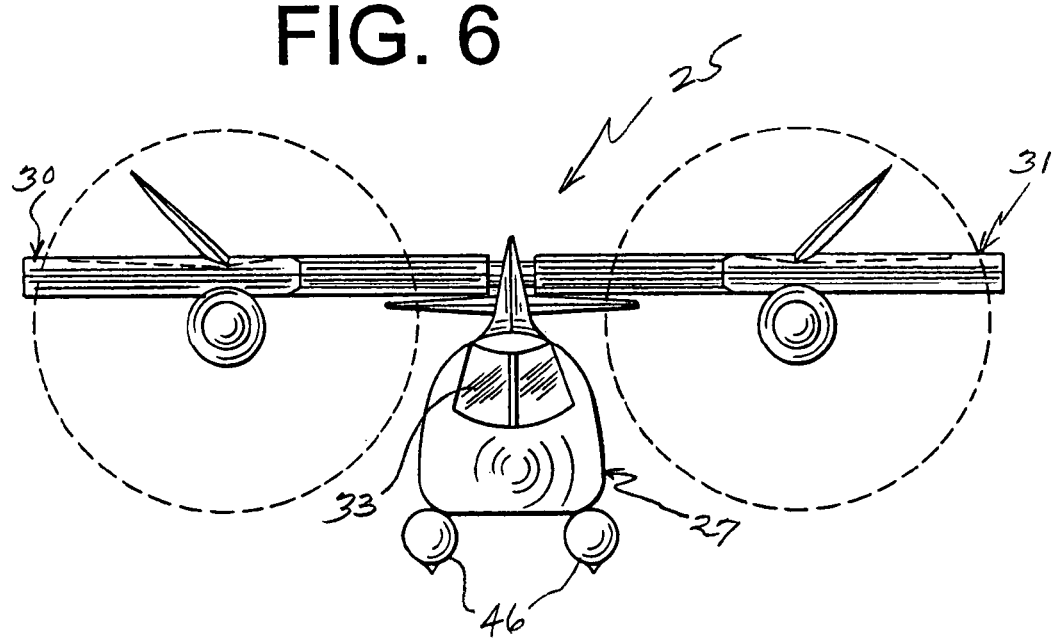
FIG. 6 is a front elevational view of the aircraft of FIGS. 3 to 5.

As seen in the plan view of the wings of the aircraft of the present invention in FIG. 4, the outer ends of the rotatable wings are cut back to space them from the propellers and provide the best possible air stream function across the wings. It is also possible that the engine and wing assemblies can be pivoted overcenter if necessary in order to obtain the proper lift at vertical takeoff and landing such as shown in the embodiment of FIGS. 10 to 13 and later explained in more detail below.

Although the engines 58 are shown to be mounted on the under sides of the wings 56, it should be appreciated that they could be mounted on the upper sides if so desired.

With respect to the diameter of the propeller, it is preferable to have it at a smaller size so that it can turn at a higher rpm for speed and make it easier to rotate the wing and engine assemblies between horizontal and vertical modes. The size of the propeller shown in the drawings is merely for illustrative purposes to show that the propellers are used to provide thrust during vertical takeoff and landing primarily and that the blades can be folded back against the engines in horizontal position.

Figure 7:
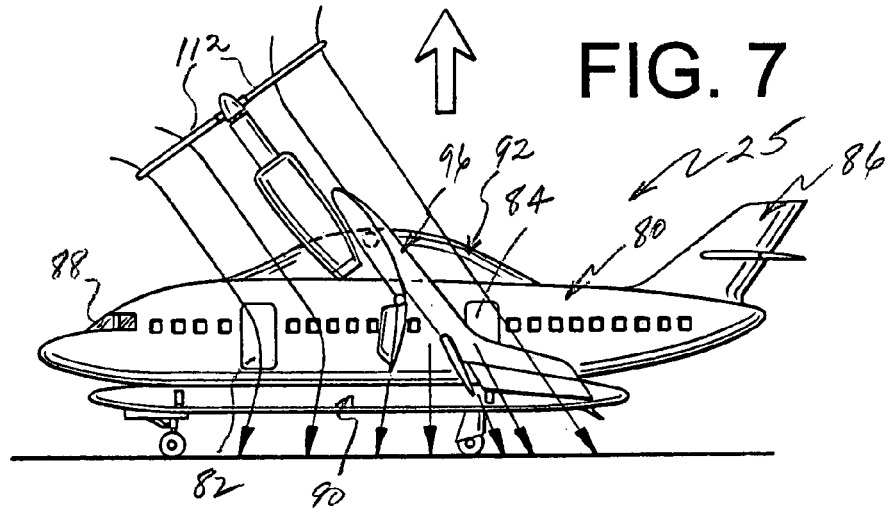
FIG. 7 is an elevational view of a modification of the invention showing a fuselage having a multiplicity of window ports and indicating wherein the fuselage is one built for carrying many passengers such as in a commercial passenger aircraft.
Figure 8:
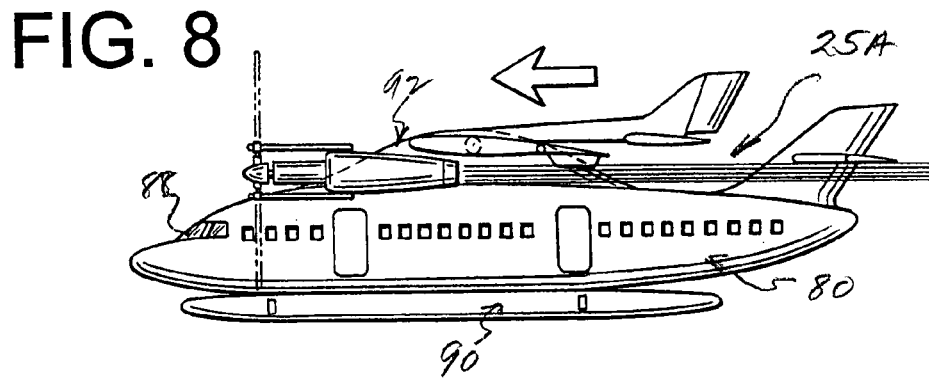
FIG. 8 is a side elevational view showing the aircraft of FIG. 7 in horizontal flying mode with the propellers in folded back non-operating position in solid lines and in dotted lines representing their operating position.
Figure 9:
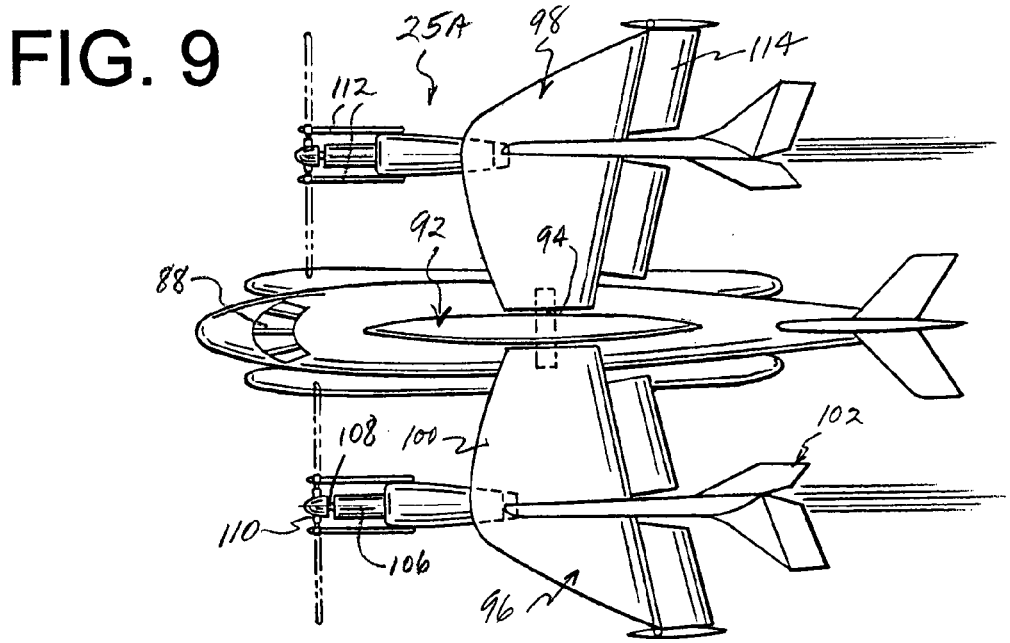
FIG. 9 is a top plan view of the aircraft shown in FIG. 8 and in the horizontal flying mode.

From the foregoing, it will be appreciated that the vertical takeoff and landing aircraft of the present invention, while illustrated in FIGS. 3 to 6 as having a fuselage for carrying a relatively small number of passengers and/or cargo, may have a fuselage that is capable of carrying a large number of passengers, such as a commercial airline and as shown in the embodiment of FIGS. 7, 8 and 9. Additionally, it can be appreciated that while the embodiment of FIGS. 3 to 6 shows one engine mounted on each wing section, any number of engines may be used to produce the necessary power for handling the type of fuselage that will give the desired performance. It can be appreciated that an engine can be mounted in a stationary fashion on the fuselage for producing additional power if that is needed. The sizes of the engines will, of course, be determined by the size of the aircraft and the desired performance. Common to all of the aircraft embodiments of the invention is that they will include a wing assembly pivotally mounted at each side of the fuselage carrying an engine and positionable between substantially horizontal and substantially vertical positions for respectively conditioning the aircraft to be in a horizontal flight mode or in a vertical flight mode. The flaps are provided at the trailing edges of the wings movable between an inline position as an extension of the wing for producing substantially horizontal flight and of course giving additional lift to the wings or at an incline to the wings when the wings are in substantially vertical position to direct the air flow from the propeller blades substantially vertically downward for obtaining substantially vertical flight mode. Moreover, the configuration of the aircraft of the invention as to the positions of the engines, the length of the propeller blades, and the position of the wing assemblies is such that when the wings are in the substantial horizontal position the tips of the blades are spaced above the ground when in operative position, thereby allowing the aircraft to land or take off along a runway if the wing and engine assemblies cannot be pivoted. Accordingly, it will be appreciated that when the wing assemblies are operatively positioned in the substantially vertical position and the flaps into substantially vertical position, the aircraft is conditioned for vertical takeoff/landing mode, while positioning the assemblies into substantially horizontal position and the flaps at inline positions with the wings causes the aircraft to be in a horizontal flying/landing mode.

Referring now to the embodiment of FIGS. 7 to 9, generally indicated by the numeral 25A, this embodiment differs from the embodiment of FIGS. 3 to 6 in that the fuselage is designed for carrying a large number of passengers. Additionally, it will be appreciated that the structures of the wings and the size of the engines will likewise be designed for handling the additional load expected from a large number of passengers and/or cargo. The arrowed lines in FIG. 7 depict the air flow during vertical takeoff and landing mode, while the large arrow indicates vertical flight mode attained by the positions of the wing and engine assemblies. The groups of lines in FIGS. 8 and 9 depict the exhaust gases and thrust of the jet engines, and the large arrow indicates the aircraft is in horizontal flight mode.

The aircraft 25A includes a fuselage 80 having front and rear doors 82 and 84, a tail assembly 86 at the trailing end of the fuselage, a cockpit 88 at the front end of the fuselage, and landing gear 90 of the same type as that in the embodiment of FIGS. 3 to 6 wherein it includes pontoons and retractable wheeled landing gear. While not shown, a suitable door will be provided to load and unload cargo. Further, the tail assembly 86 will have both vertical and horizontal stabilizers as well as control surfaces like a rudder and elevators respectively producing yaw and pitch for the aircraft.

A vertically and longitudinally extending wing-mounting superstructure 92, which also serves as a vertical stabilizer for the aircraft particularly when it is in horizontal flight mode, receives the wing-mounting shaft 94 to which wing and engine assemblies 96 and 98 are attached so that rotation of the shaft 94 will cause pivoting of the wing and engine assemblies between their substantially vertical position for effecting the vertical flight mode and their substantially horizontal position for effecting the horizontal flight mode. Suitable drive means is provided for driving the wing and engine assemblies between the vertical and horizontal position and controlled in the aircraft cockpit. Each wing and engine assembly includes a wing 100 shaped much like that shown in the embodiment of FIGS. 3 to 6, rearwardly extending tail assemblies 102 and jet fuel driven turbine engines 104 mounted on the wings. As in the previous embodiment, each engine includes a transmission 106 having an output shaft 108 on which a propeller 110 is mounted.

Like the other embodiment, the propellers include a plurality of blades 112 movable between operative position, as seen in FIG. 7, and non-operating position, as shown in solid in FIGS. 8 and 9. Also, the operative position is shown in dotted lines in FIGS. 8 and 9. Additionally, it may be appreciated that the propeller blades may be adjustable for pitch. Thus, the propellers are movable between the operative position and foldable back against the engines in inoperative position depending upon the flight mode selected by the pilot. The blades will always be in operative position during vertical takeoff and landing mode of the aircraft where the engine operates as a turbo prop engine, but may be optionally in the operative or non-operative position during horizontal flight and/or during horizontal flight for horizontal landing on a runway. Flaps 114 are provided at the trailing edges of the wings for use in vertical takeoff and landing mode to direct the air stream more directly downwardly on a vertical plane, as shown in FIG. 7, and to thereafter be movable into inline position with the wings in horizontal flight.

Suitable control surfaces are provided on the wings to give directional control or rotational control to the aircraft. Ailerons may be provided on the flaps and vertical control members may be provided on the wing tips as in the embodiment of FIGS. 3 to 6. Operation of this embodiment 25A will be substantially the same as that of the embodiment of FIGS. 3 to 6.

Figure 10:
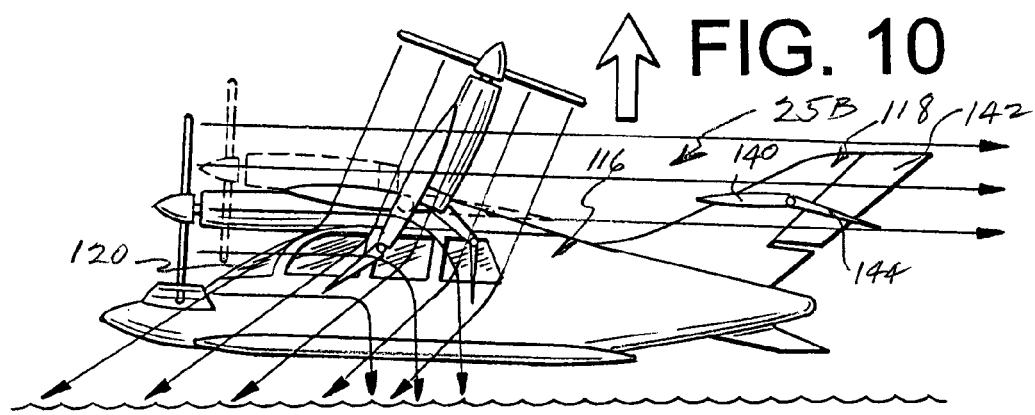
FIG. 10 is a side elevational view of a further modification of the invention and illustrating an aircraft with floats and the wing and engine assemblies tilted in solid lines for vertical takeoff and landing mode and showing the engine and wing assemblies in phantom when the aircraft is in horizontal flying mode.
Figure 11:
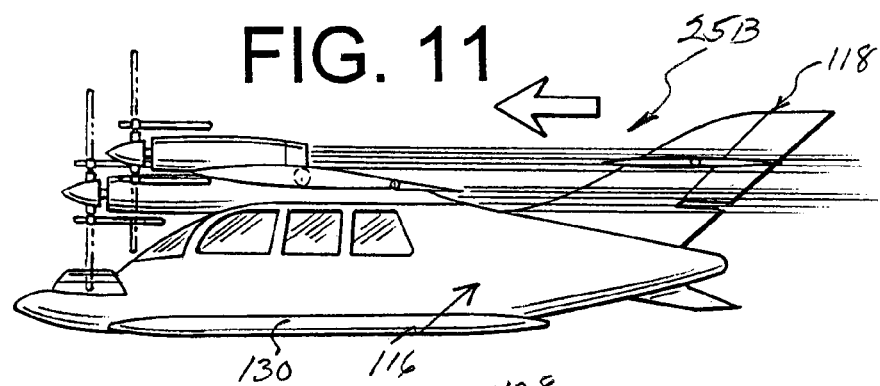
FIG. 11 is a side elevational view of the modification of FIG. 10 and showing the engine and wing assemblies in horizontal position for horizontal flying mode with the propeller blades folded back in non-operating position.
Figure 12:
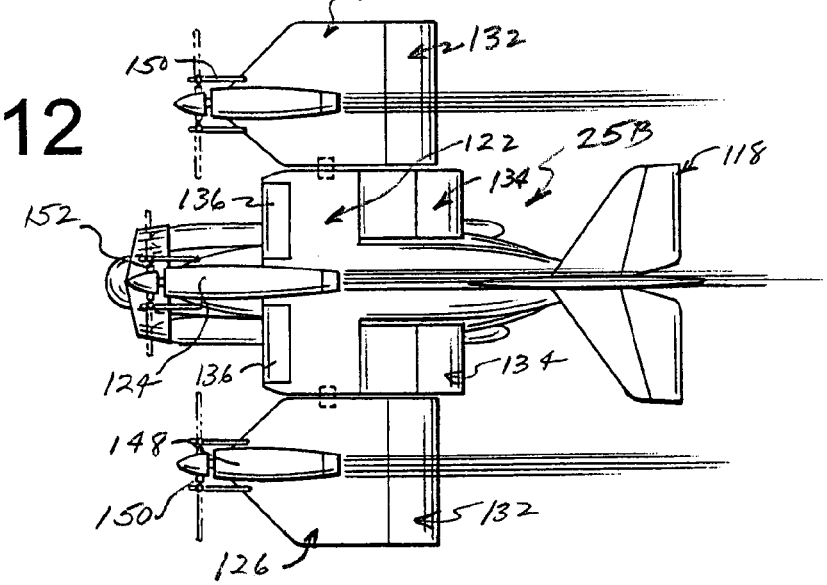
FIG. 12 is a top plan view of the aircraft of FIGS. 10 and 11 and showing the aircraft in horizontal flight mode.
Figure 13:
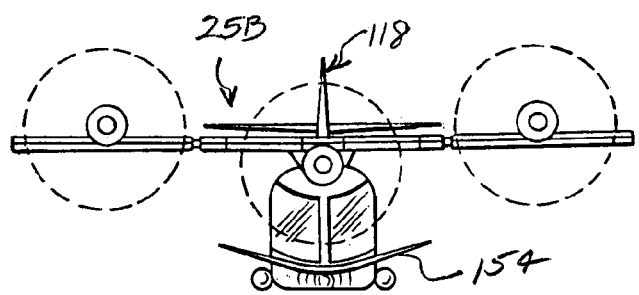
FIG. 13 is a front elevational view of the aircraft of FIG. 12.

A still further embodiment of the invention is shown in FIGS. 10 to 13, wherein the aircraft is generally designated by the numeral 25B and differs from the previous embodiments in that this aircraft includes three engines, one of which is stationarily mounted on the fuselage and further that the movable wing and engine assemblies extend out from a fixed wing portion at both sides of the fuselage. However, this embodiment will also operate to provide vertical takeoff and landing modes as well as landing horizontally on a runway without damaging the propellers. While this embodiment is shown to only include floats that enable it to land and take off on water, it will be appreciated that the floats may be also provided with retractable wheel landing gear, so that it can land on or take off from land. The large arrow in FIG. 10 depicts the aircraft to be in vertical flight mode, while the large arrow in FIG. 11 depicts the aircraft in horizontal flight mode. The arrowed lines in FIG. 10 illustrates the air flow generated by the propellers, while the groups of lines in FIGS. 11 and 12 depict the exhaust gases and thrust of the jet engines. The dash lines in FIG. 13 indicate the path of the outer ends or tips of the propeller blades.

The aircraft 25B includes a fuselage 116 having a tail assembly 118 at the rear of the fuselage and a cockpit 120 at the front end of the fuselage. A fixed wing 122 is mounted on the top side of the fuselage and a jet fuel driven turbine engine 124 is mounted on the fixed wing 122, and accordingly on the fuselage. Movable wing and engine assemblies 126 and 128 are carried on the opposite ends of the fixed wing 122. Floats 130 serving as the landing gear are mounted on the underside of the fuselage. Flaps 132 are provided at the trailing edges of the movable wing assemblies 126 and 128, and flaps 134 are provided at the trailing edge of the fixed wing 122 at both sides of the fuselage. Additionally, the flaps 134 are sectional and include multiple sections, each of which is movable relative to the other to provide the necessary operation for the vertical takeoff and landing mode. Additional flaps 136 are provided at the leading edge of the fixed wing to enhance operations where flaps are needed to operate the aircraft. It will also be understood that control surfaces in the manner of ailerons will be provided on the movable or wing assemblies or the fixed wing as needed to provide the proper maneuverability of the aircraft.

The tail section 118 includes a vertical stabilizer 138 and a horizontal stabilizer 140, each of which includes control surfaces for producing yaw and pitch movements of the aircraft. A rudder 142 is provided on the vertical stabilizer, while elevators 144 are provided on the horizontal stabilizer. Additional vertical stabilizers may also be provided on the fuselage such as the stabilizer 146 in the form of a fin at the rear end of the fuselage and below the tail assembly. This fin can also serve as a rudder when landing on or taking off from water.

The movable wing and engine assemblies 126 and 128 include jet fuel driven turbine engines 148 having propellers 150 mounted on an output shaft of a transmission in the same manner as the engines in the previous embodiments. Further, the blades of the propeller are movable between operative position as shown in FIG. 10 or inoperative position as shown in FIGS. 11 and 12. It will be appreciated that they will be in operative position during all vertical takeoff and landing procedures as in the previous embodiments and in inoperative position during horizontal flight where only the jet engines will provide the necessary thrust in order to take the aircraft at a high speed. Further, the fixed engine 124 includes a propeller 152 of the same type as on the other engines which includes movable propeller blades that are movable between operative and non-operative positions.

This embodiment differs slightly from the previous embodiment also in that when the movable wing and engine assemblies are pivoted for takeoff or landing maneuvers, they are oriented in an overcenter vertical position where they can be driven to the position shown in FIG. 10 that is inclined from the vertical in order to additionally provide the necessary vertical thrust for takeoff and landing maneuvers.

In order to accommodate the propeller blades of the fixed engine 124, which during vertical takeoff and landing maneuvers forces air across the fixed wing section and downwardly to the landing surface by virtue of the flaps 134, a cutout is provided in the front part of the fuselage. To provide additional stability for the aircraft, a short wing section 154 is provided below that propeller and to also control the flow of the air stream over the fuselage and the fixed wing.

In operation, the aircraft 25B can take off or land vertically or horizontally as in the other embodiments. Takeoff and landing vertically requires the manipulation of the propeller blades into operative position as shown in FIG. 10 and in dotted lines in FIGS. 11 and 12, while operation of the aircraft in horizontal flying mode is generally limited to use of the jet engine thrust by itself in order to obtain the maximum speed for the aircraft. In landing horizontally on a runway or a body of water, the propellers can be placed in operating mode to assist in the maneuverability and control of the aircraft during a landing or takeoff mode. When the movable wing and engine assemblies are pivoted to the positions shown in FIG. 10 for vertical takeoff and landing maneuvers, once the aircraft reaches a desired altitude, the movable wing and engine assemblies can be rotated back toward the horizontal position for attaining horizontal flight. Once horizontal flight is attained, the propellers may be selectably disengaged from the transmission and deactivated and folded back, as shown in solid lines in FIGS. 11 and 12, to allow the pure jet flying mode for the aircraft and to attain the maximum possible speed for the aircraft.

In view of the foregoing, it is respectfully appreciated that the present invention provides a very efficient and unique structure for attaining both vertical takeoff and landing maneuvers as well as for horizontal flight, so that the aircraft can be landed or taken off vertically or horizontally.

It will be understood that modifications and variations may be effected without departing from the scope of the novel concepts of the present invention, but it is understood that this application is to be limited only by the scope of the appended claims.

The invention is hereby claimed as follows:

1. A vertical takeoff and landing aircraft comprising:
a fuselage for carrying passengers and/or cargo, a tail assembly at the rear end of the fuselage,
a movable wing assembly including a wing pivotally mounted at each side of the fuselage and positionable between substantially horizontal and substantially vertical positions for respectively conditioning the aircraft for horizontal and vertical flight modes,
an engine carried by each wing assembly, each said engine having a propeller with blades,
flaps at the trailing edges of the wings movable between an inline position as an extension of the wings for producing substantially horizontal flight mode and at an incline to the wings when the wings are in a substantially vertical position to direct air flow from the propeller substantially vertically downward for the substantially vertical flight mode, and
each wing assembly including a tail assembly extending rearwardly therefrom,
the configuration of the aircraft as to the position of the engines, the length of the propeller blades, and the position of the wing assemblies being such that when the wings are in the substantial horizontal position, the tips of the blades are spaced above the ground thereby allowing the aircraft to land or take off along a runway, whereby positioning the wing assemblies into substantially vertical position and the flaps into substantially vertical position orients the aircraft in vertical takeoff/landing mode, and positioning the wing assemblies into substantially horizontal position and the flaps at inline positions orients the aircraft in the horizontal flying/landing mode.

2. The aircraft of claim 1, wherein the engines are jet fuel driven turbines having means for driving said propellers in turboprop mode and means for operating in pure jet mode.

3. The aircraft of claim 2, which further includes means for mounting the propeller blades for movement between an operating mode for producing trust and a non-operating mode for producing no thrust, whereby when the aircraft is in vertical takeoff/landing and horizontal landing modes, the engines are in turboprop mode and the propeller blades are in said operating mode, and when the aircraft is in horizontal flying mode, the engines are in pure jet mode and the blades are in said non-operating mode.

4. The aircraft of claim 1, which further includes pontoons and wheel landing gear permitting the aircraft to take off from or land on water or land.

5. The aircraft of claim 1, wherein each tail assembly includes a stabilizer with a control surface.

6. The aircraft of claim 1, wherein each said tail assembly includes an inclined stabilizer and combination rudder/elevator.

7. The aircraft of claim 1, wherein each said tail assembly also includes a horizontal stabilizer.

8. The aircraft of claim 1, wherein said tail assembly includes a vertical and a horizontal stabilizer.

9. The aircraft of claim 1, wherein the engines are jet fuel driven turbines having means for driving propellers in turboprop mode and means for operating in pure jet mode).

10. The aircraft of claim 9, which further includes means for mounting the propeller blades for movement between an operating mode for producing thrust and a non-operating mode for producing no thrust, whereby when the aircraft is in vertical takeoff/landing and horizontal landing modes, the engines are in turboprop mode and the propeller blades are in said operating mode, and when the aircraft is in horizontal flying mode, the engines are in pure jet mode and the blades are in said non-operating mode.

11. A vertical takeoff and landing aircraft comprising:
a fuselage for carrying passengers and/or cargo, a tail assembly at the rear end of the fuselage,
a movable wing assembly pivotally mounted at each side of the fuselage and positionable between substantially horizontal and substantially vertical positions for respectively conditioning the aircraft for substantially horizontal and vertical flight modes,
each said movable wing assembly with a wing member having leading and trailing edges, an inner end and an outer end, the inner end being closely adjacent to the fuselage,
a jet fuel turbine engine mounted on each of the wing members, each said engine having a propeller shaft and a propeller mounted thereon with a plurality of blades, said blades movable between an operating mode to produce an air flow across the wing whereby the engine operates in a turboprop mode to produce thrust, and a non-operating mode with the blades folded along the engine whereby the engine operates in a jet mode to produce thrust, flaps at the trailing edges of the wing members operable between a position inline with the wing members for producing substantially horizontal flight mode for the aircraft and at an incline to the wing members when the wing is in a substantially vertical position and the propeller blades are in operating mode to direct air flow from the propeller blades substantially vertically downward for the substantially vertical flight mode, and each wing assembly including a tail assembly extending rearwardly therefrom, the configuration of the aircraft as to the position of the engines, the length of the propeller blades, and the position of the wing members being such that when the wing members are in the substantial horizontal position, the tips of the blades are spaced above the ground thereby allowing the aircraft to land or take off along a runway, whereby positioning the wing members into substantially vertical position and the flaps into substantially vertical position conditions the aircraft for said vertical flight mode, and positioning the wing members into substantially horizontal position and the flaps at inline positions conditions the aircraft for said horizontal flight mode.

12. The aircraft of claim 11, wherein each tail assembly includes an inclined stabilizer with a control member and a horizontal stabilizer.

* * * * *